United States Patent [19]

Kondo

[11] Patent Number: 5,770,348
[45] Date of Patent: Jun. 23, 1998

[54] OPTICAL DISK AND METHOD FOR ITS MANUFACTURE

[75] Inventor: Tetsuya Kondo, Kanagawa-ken, Japan

[73] Assignee: Victor Company of Japan, Ltd., Yokohama, Japan

[21] Appl. No.: 622,392

[22] Filed: Mar. 27, 1996

[30] Foreign Application Priority Data

Mar. 29, 1995 [JP] Japan .................................. 7-097813
Jul. 14, 1995 [JP] Japan .................................. 7-201446

[51] Int. Cl.⁶ .................................. G11B 7/24; G11B 7/26
[52] U.S. Cl. .................. 430/321; 430/270.11; 430/945; 369/284; 428/64.4; 428/64.7; 428/65.2; 427/164; 264/1.33; 264/107
[58] Field of Search .................. 430/270.11, 321, 430/945; 369/283, 284; 428/64.4, 64.7, 65.2; 427/510, 164; 264/106, 107, 1.33, 1.36, 1.38, 1.7

[56] References Cited

U.S. PATENT DOCUMENTS 5,306,349 4/1994 Nee .............................................. 134/1
5,312,663 5/1994 Kosinski et al. ......................... 430/945
5,424,102 6/1995 Mizukuki et al. ....................... 427/510
5,552,098 9/1996 Kudo et al. .............................. 264/100

FOREIGN PATENT DOCUMENTS 62-102947  5/1987  Japan .
6-223416   8/1994  Japan .

*Primary Examiner*—John A. McPherson
*Attorney, Agent, or Firm*—Michael N. Meller

[57] ABSTRACT

This invention provides an optical disk whose recorded information cannot be easily copied to other recording media, with practically no degradation of strength. The optical disk of this invention has a ring-shaped signal layer made of radiation curable resin on a transparent substrate, a reflective layer formed on this signal layer, and a protective layer formed on this reflective layer; moreover, the above mentioned signal layer has a peel strength against the above mentioned transparent substrate in the range of about 20/100 to about 80/100 according to the JIS-K5400 test method; and if the outer and inner diameters of the mentioned signal layer are represented by Os and Is respectively, the outer and inner diameters of the mentioned reflective layer are represented by Or and Ir respectively, and the outer and inner diameters of the mentioned protective layer are represented by Op and Ip respectively, these diameters satisfy the relationships, $$Os < Or < Op$$

and $$Ip < Ir < Is.$$

8 Claims, 7 Drawing Sheets

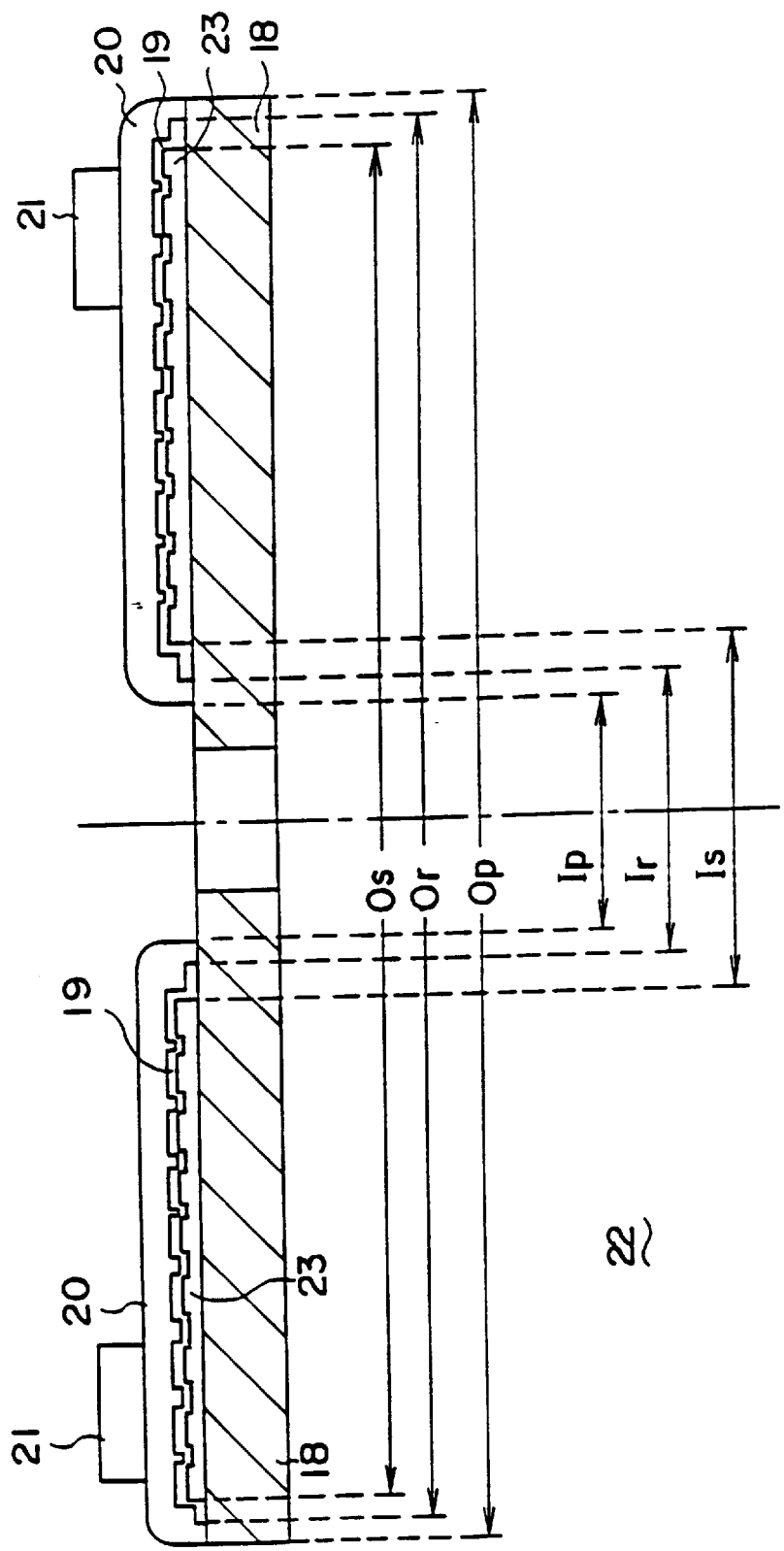

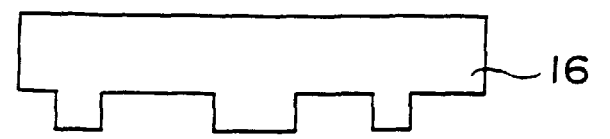
FIG. 5(A)
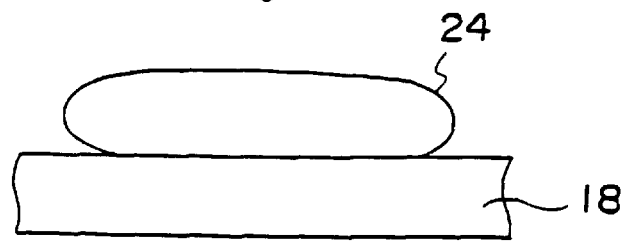
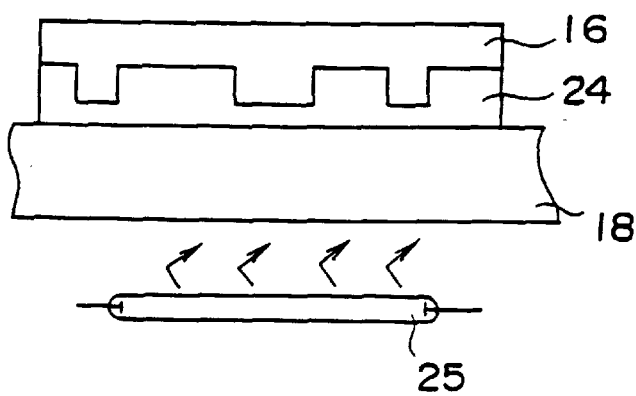
FIG. 5(B)
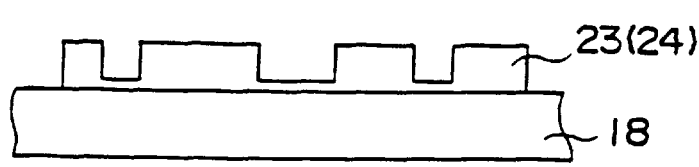
FIG. 5(C)
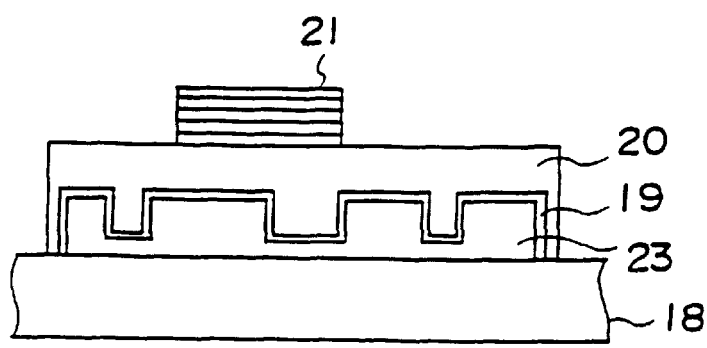
FIG. 5(D)

OPTICAL DISK AND METHOD FOR ITS MANUFACTURE

BACKGROUND OF THE INVENTION

1. Field of the Invention

This invention relates to an optical disk that has a signal layer on a transparent substrate and a reflective layer on this, and to a method for its manufacture.

2. Description of the Prior Art

The spread of optical disks, beginning with CD-ROM (Compact Disk Read Only Memory), has been remarkable in recent multimedia society.

These CD-ROMs are used not only for computers, but most recently CD-ROMs for multifunctional games have appeared, and content in the fields of computers and games is being moved from the earlier floppy disks and ROM cards to CD (compact disk). Furthermore, DVD (Digital Video Disk) that makes CDs high resolution has appeared and investigations are beginning to look at applications in multimedia other than for movie content.

On the other hand, together with the spread of optical disks, so-called pirate CDs that are illegal copies that steal profits from copyright holders, are rapidly increasing in share.

In making an illegal copy of an optical disk, usually a commercial optical disk is purchased and played back on a CD player to make a master tape. This is then used to mass produce illegal copies by methods that are the same as the manufacturing methods for common CDs. In order to prevent this kind of illegal copy, there are modified optical disks so that they can be played back only with a special player. Examples of such modifications are those that playback cannot begin unless key information is entered, or those that generate errors on standard CD players by superimposing a specific signal on top of the main signal.

These methods for preventing copies have the excellent advantage that playback cannot be performed with standard players, but they are powerless against and cannot resist copying techniques that do not have the operation of playback, in other words, copying techniques that physically transfer, in their entirety, the crenulation of the signal that are etched into the surface of the disk.

Since these kinds of copy methods take and copy the crenulation information of the signal of the original disk as is, completely without need of a playback step, no matter at what high degree or at what complexity, the above methods for preventing copies become meaningless.

Methods for copying the signal crenulation from optical disks have appeared, for example, in Published Unexamined Japan Patent Application Sho (Patent Kokai Showa) 62-192947. According to these methods, the signal surface of an optical disk is disassembled and exposed, and the copy is taken from the signal surface using existing copying techniques. This known technology is for added-signal type optical disks but as a technique is applicable for all optical disks that read signals in an crenulated pattern.

FIG. 1 is a cross section showing the replicating steps for prior optical disks.

If one explains the above replicating method based on FIG. 1, first a ring spacer is removed from a recorded added-signal type optical disk that has an air sandwich structure formed with a hollow part in its interior, and disk substrate 2 that has recording layer 1 to which pits have been added is removed (FIG. 1(A)).

Then, this disk substrate 2 with the signal layer is placed in a plasma reaction chamber, and plasma polymerized layer (removable layer) 3 of tetrafluoroethylene is vapor deposited to a thickness, for example, of 500 Å, onto the surface of recording layer 1 that has the crenulated pits (FIG. 1(B)).

Next, an acrylic resin type filler layer 4 is formed on top of this in a state of being pressed by acrylic resin plate 5 (FIG. 1(C)).

Next, acrylic resin plate 5 is removed together with filler layer 4 from this disk substrate 2 side, and makes an acrylic resin plate 5 that has an information pattern that is the reverse of the recording layer 1 of disk substrate 2 and holds filler layer 4 (FIG. 1(D)).

Then reflective layer 6 is formed of aluminum onto the surface of this filler layer 4 to a thickness of, for example, about 1000 Å, and protective layer 7 is additionally formed of UV-curable resin to a thickness of 5 mm (FIG. 1(E)).

Then, this is fabricated into a disk, and hollow-structure optical disks are assembled using ring spacers.

Next, a method for physically duplicating the signals of CD-ROM by combining the above method with existing technology will be described.

This method can be divided into two major process steps: the first half to make a stamper from a CD-ROM, and the second half to make CD-ROMs from the stamper.

As shown in FIG. 2, for example, a signal surface having crenulated pits is formed on the surface of disk substrate 9 on CD-ROM 8 and reflective layer 10, protective layer 11 and label layers 12 are sequentially fabricated on this.

First, label layers 12, the protective layer 11, and the reflective layer 10 that were printed onto the disk surface are removed by physical means or by chemical means to expose the signal surface 13 of disk substrate 9 (FIG. 2(B)).

Here, physical means indicate dynamic techniques such as, for example, the method of peeling these three layers simultaneously by sticking adhesive tape to the disk surface and pulling it off. Also, chemical means indicate chemical techniques such as, for example, dissolving and removing these 3 layers by immersing the entire disk in heated aqueous strong alkali solution as a method to remove film from compact disk as disclosed in Published Unexamined Japan Patent Application Hei (Patent Kokai Heisei) 6-223416.

In the above mentioned Published Unexamined Japan Patent Application Sho 62-192947, the substrate from which the three layers are removed becomes the duplicated substrate, and a disk is obtained with negative crenulated pattern. This CD-ROM assembly falls outside standards. The latter methods make stampers by the same process used to make stampers from the resist masters of regular optical disks. These methods have been recorded, for example, in "Manufacturing processes for optical and optomagnetic disks," (Gekkan Semikondakuta—Wa-rudo, 1989 April, pp. 124–127) and elsewhere.

Next, nickel conductive layer 14 is formed on top of signal surface 13 of disk 9 by sputtering or electroless plating (FIG. 2(C)), and plated film 15 is formed on top of this by nickel electroforming (FIG. 2(D)). Then, one obtains nickel stamper 16 with a thickness of 0.3 mm by peeling at the interface between disk substrate 9 and nickel conductive layer 14. The crenulated pits of the surface of this stamper 16 are the reverse of the starting disk.

After a stamper is made in this way, CD-ROMs are made from it as follows.

First, stamper 16 that has been formed shown in FIG. 3(A) is placed in an injection molding machine, and polycarbonate is injection molded using this (FIG. 3(B)). Then, by peeling stamper 16 from resin 17, one obtains disk substrate 18 having a pattern with the reverse topology of stamper 16 (FIG. 3(C)). In other words, in going through two transfers, one makes a substrate having the same topology as the starting disk.

Next, one makes disks as shown in FIG. 3(D) in the same way as the final process for regular CDs. In other words, reflective layer 19 is formed of 600–1000 Å thick aluminum or its alloy, and further, protective layer 20 is formed of 5–20 μm thick UV-curable resin. Continuing, label layer 21 is printed on this surface as necessary and the CD-ROM is completed.

Now, it is possible to duplicate other forms of disks, for example, even bonded optical disks by adding a process of removing the adhesive at the beginning of the above process.

Thus, prior copy protection methods prevent copying mainly by modifying the signal format, and have the extremely good advantage that one cannot playback with common players; however, they are powerless against copy methods that do not accompany the playback operation, in other words, in which the copying technique comprises physical transfer of the signal crenulation that are etched into the disk surface.

BRIEF SUMMARY OF THE INVENTION

1. Object of the Invention

This invention has the objective of providing optical disks whose recorded information cannot be easily copied to another recording medium, and have practically no degradation in strength, and a method for manufacturing said disks.

2. Brief Summary

The first aspect of this invention provides an optical disk comprising:

a transparent substrate;

a ring-shaped signal layer on top of said transparent substrate, which is made of radiation curable resin and has a peel strength against said transparent substrate in the range of about 20/100 to about 80/100 in the test method JIS-K5400;

a reflective layer that is formed on top of said signal layer; and a protective layer that is formed on top of said reflective layer;

wherein the outer and inner diameters of said signal layer are represented by Os and Is respectively, the outer and inner diameters of said reflective layer are represented by Or and Ir respectively, and the outer and inner diameters of said protective layer are represented by Op and Ip respectively, these diameters satisfy the relationships, $$Os<Or<Op$$

and $$Ip<Ir<Is.$$

Also, the second aspect of this invention provides a method for manufacturing optical disks comprising:

a step of forming a ring-shaped signal layer on top of a transparent substrate from radiation curable resin that has a peel strength in the range of about 20/100 to about 80/100 according to the test method JIS-K5400;

a step of forming a reflective layer on top of said signal layer; and a step of forming a protective layer on top of said reflective layer;

and if the outer and inner diameters of said signal layer are represented by Os and Is respectively, the outer and inner diameters of said reflective layer are represented by Or and Ir respectively, and the outer and inner diameters of said protective layer are represented by Op and Ip respectively, these diameters satisfy the relationships, $$Os<Or<Op$$

and $$Ip<Ir<Is.$$

In addition, the third aspect of this invention provides an optical disk comprising:

a transparent substrate; and multiple recording sections formed from a ring-shaped signal layer, a reflective layer formed on top of said signal layer, and a protective layer formed on top of said reflective layer;

wherein said signal layer of at least one of said multiple recording sections has a peel strength against the layer beneath it in the range of about 20/100 to about 80/100 according to the test method JIS-K5400;

wherein the outer and inner diameters of said signal layer are represented by Os and Is respectively, the outer and inner diameters of said reflective layer on said signal layer are represented by Or and Ir respectively, and the outer and inner diameters of said protective layer on said reflective layer are represented by Op and Ip respectively, these diameters satisfy the relationships, $$Os<Or<Op$$

and $$Ip<Ir<Is.$$

Then, according to this invention constituted as above, by making the signal layer of a different material from the transparent substrate and by keeping the adhesive strength of the signal layer within the above mentioned limits, the resistance to shear stress can be weaken to some degree. Thus, if one attempts to peel the protective layer or the like by physical means in order to expose the signal layer, the signal layer peels together with the label layer, the protective layer, and the reflective layer, and is removed.

Also, if one attempts to peel the label layer and the protective layer by chemical means, dissolution occurs through the signal layer because the signal layer of the UV-curable resin is easily dissolved by the aqueous alkali solution. Therefore, it is impossible to expose the crenulated surface of the signal layer by either means.

On the other hand, in normal use times, it is necessary to have sufficient durability; however, if the outer diameters and the inner diameters of each layer are limited as described above, one obtains a structure in which the upper layer envelopes the layer directly below it, and in practice, sufficient durability can be obtained.

Also, this invention can be applied for optical disks having multilayered signal structures in which recording section formed from signal layers, reflective layers, and protective layers are multi-laminated. In this case, the upper surface of the protective layer becomes a signal layer, for example, by forming a crenulated signal thereon, and accordingly, the protective layer of the recording section of the lower layer can also be signal layer of the recording section of the upper layer.

The above and other related objects and features of this invention will be apparent from a reading of the following description of the disclosure found in the accompanying drawings and the novelty thereof pointed out in the appended claims.

BRIEF DESCRIPTION OF THE DRAWINGS

FIG. 4 is a cross section showing one example of an optical disk of this invention;

FIG. 5 is a process drawing showing a process for manufacturing the optical disk shown in FIG. 4;

DETAILED DESCRIPTION OF THE INVENTION

Figure 1A:
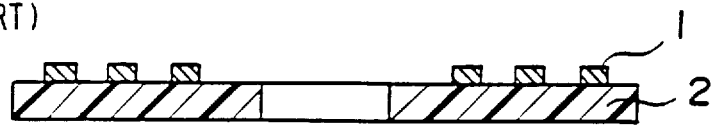
FIG. 1 is a process drawing showing the duplicating processes for prior optical disks.
Figure 1B:
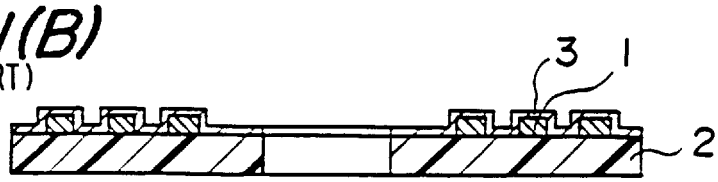
Figure 1C:
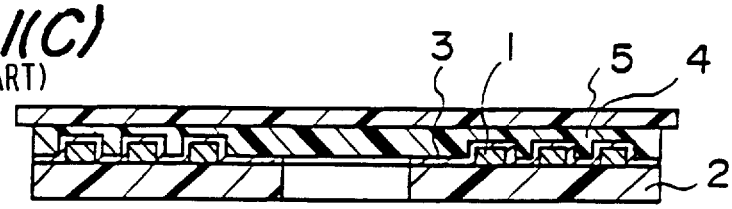
Figure 1D:
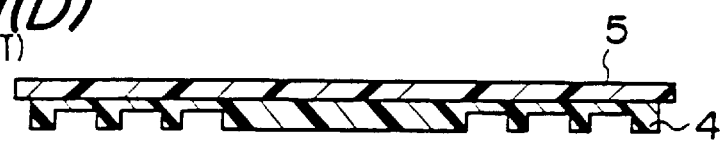
Figure 1E:
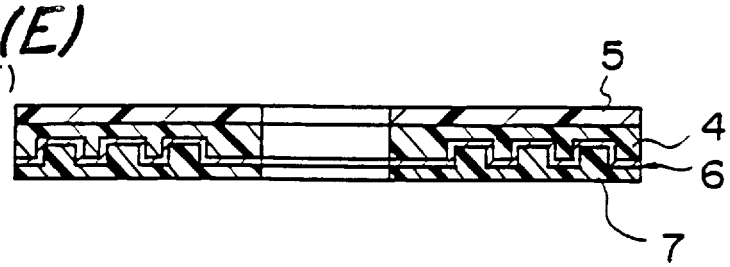
Figure 2A:
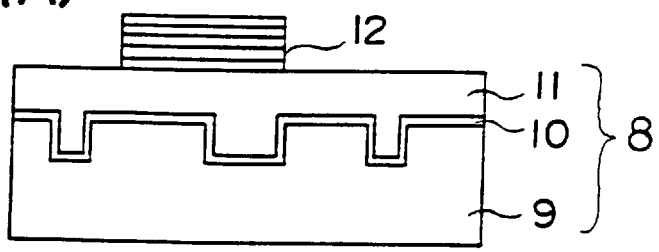
FIG. 2 is a process drawing showing a method for making a stamper from a CD-ROM based on existing technology.
Figure 2B:
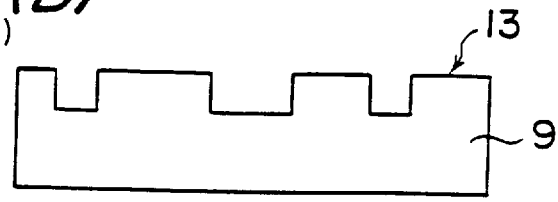
Figure 2C:
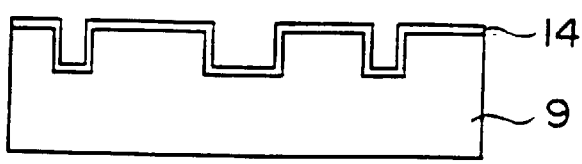
Figure 2D:
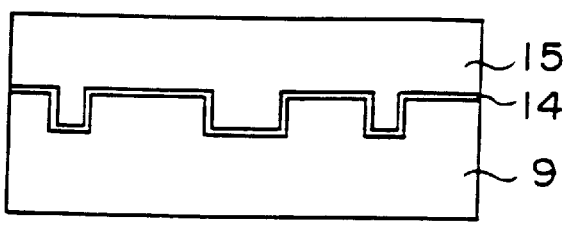
Figure 2E:
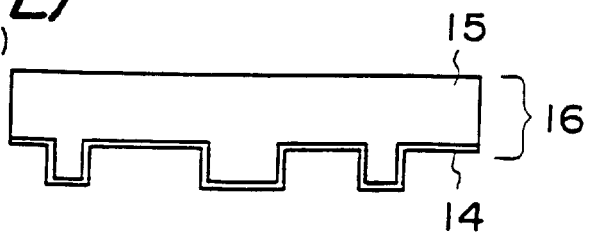
Figure 3A:
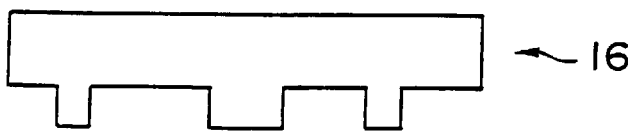
FIG. 3 is a process drawing showing a method for making CD-ROMs from a stamper based on existing technology.
Figure 3B:
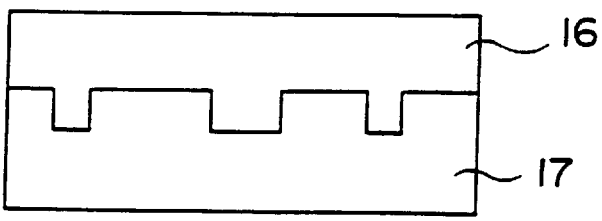
Figure 3C:
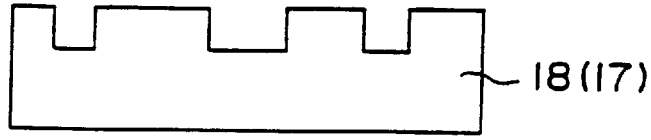
Figure 3D:
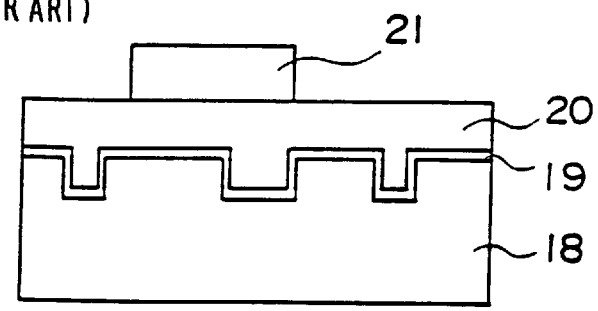

An experimental example of an optical disk of this invention and a method for manufacturing it is described below based on the attached drawings.

FIG. 4 is a cross section showing one example of an optical disk of this invention, and FIG. 5 is a process drawing showing a process for manufacturing the optical disk shown in FIG. 4.

As shown in FIG. 4, optical disk 22 has a dish-shaped disk 18 for a transparent substrate; signal layer 23 is, in a ring-shape, on top of this with the signal crenulations formed; reflective layer 19 is formed on top of signal layer 23; and protective layer 20 is formed on top of this to result in a laminated structure. In addition, label layer 21 on which information relating to the disk is printed is formed on top of protective layer 20 as necessary.

Then, the peel strength of signal layer 23 against disk substrate 18 is set to a strength so that an attempt to physically peel the upper layer part from signal layer 23 causes damage to signal layer 23, in other words, to within the range of 20/100–80/100 in test method JIS-K5400.

Here, in the case that the peel strength is less than 20/100, damage to the signal layer arises when the disk substrate 18 that with signal layer attached is peeled from the stamper because the adhesive strength to disk substrate 18 is too weak. In other words, because the degree of contact between the signal layer 23 and the disk substrate 18 is low, when the substrate is peeled from the stamper, peeling occurs not between the signal layer 23 and the stamper, but between the signal layer 23 and the disk substrate 18. Therefore, one cannot manufacture proper optical disks whose peel strength is less than 20/100.

As the above disk substrate 18, for example, polycarbonate can be used, but it is not limited to this. Any material can be used as long as it is transparent to the writing and reading lasers; for example, not only resin materials such as acrylic resin or polyolefin resin and the like, but even glass substrates and the like can be used.

Also as the material for signal layer 23, one can use radiation curable resins that are cured by irradiation with ultraviolet radiation. As representative examples of materials for these resins, one can use UV curable resins that are cured by ultraviolet radiation, but one can also use electron beam curable resins that are cured by electron beams or thermal curable resins that are cured by heat. Whichever is used, any combination of the two is good as long as the peel strength falls within the range mentioned above.

Also, as these kinds of curable resins, hardeners that relatively easily dissolve in aqueous alkali solutions, for example, sodium hydroxide, sodium phosphate, sodium carbonate, sodium lauryl sulfate, and the like are used.

As these kinds of radiation curable resins, one can use compounds that are mixtures of one or more of the sensitive unsaturated resins shown in C1 through C4 below with a photoinitiator.

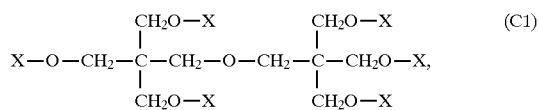

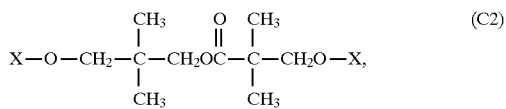

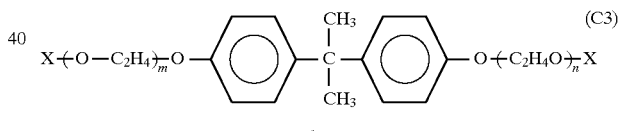

and

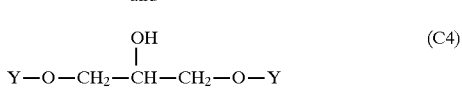

wherein
  X is an acryloyl group,
  m+n=4 and
  Y is a methacryloyl group.
Here,
  C1 shows, for example, DPHA (tradename of Nippon Kayaku Co., Ltd.),
  C2 shows, for example, MANDA (tradename of Nippon Kayaku Co., Ltd.),
  C3 shows, for example, R551 (tradename of Nippon Kayaku Co., Ltd.), and
  C4 shows, for example, G-101P (tradename of Kyoeisha Chemical Co., Ltd.).

Also, as photoinitiator one can use 2-hydroxy-2-methyl-1-phenylpropane-1-one, or the like, and concretely one can use, for example, Darocur 1173 (tradename) made by Merck Japan Limited.

As reflective layer 19, generally one can use aluminum film, but is not limited to this. For example, one can use alloys such as aluminum with tantalum, titanium, chrome, and the like; and further, it is even good to use metal such as gold and chrome. Also, for recordable disks, publicly known rewritable films are applicable.

As protective layer 20, generally one can use UV curable resins, but it is not limited to this. Also, as needed, two disks can be bonded through adhesive into a structure.

Also, when it is supposed that the outer diameter and the inner diameter of the above mentioned signal layer 23 are Os and Is respectively, the outer diameter and the inner diameter of reflective layer 19 are Or and Ir respectively, and the outer diameter and the inner diameter of protective layer 20 are Op and Ip respectively, the conditions shown below are sufficient:

$$Os < Or < Op$$

and $$Ip < Ir < Is$$

In other words, it is obvious that one has a structure in which the lower layers are enveloped by the upper layers; in the end, all of the layers are covered by protective layer 20 including their inner and outer edges. In this way, durability is highly maintained during normal use times.

In this way, by making signal layer 23 and disk substrate 18 of different materials and by weakening the adhesion and the peel strength of signal layer 23 to substrate 18 within the range mentioned above, it is weakened against shear stress. Thus, if one attempts to expose the signal layer using physical techniques such as adhesive tape with the objective of illegally copying it, the signal layer 23 is removed from the substrate side together with the reflective layer 19, the protective layer 20, and the label layer 21, and it becomes impossible to duplicate.

Furthermore, since the signal layer 23 is made of radiation curable resins that easily dissolve in aqueous alkali solution, if one attempts to peel and expose signal layer 23 using chemical means, signal layer 23 is also dissolved together with the reflective layer 19, the protective layer 20, and the label layer 21, and the crenulations of the signal are erased.

Accordingly, by either means, it is impossible to expose the crenulated surface of signal layer 23 without loss, and the signal layer cannot be duplicated.

On the other hand, it is necessary that the optical disk have sufficient durability over normal use times; however, by limiting the dimensions of the inner diameters and the outer diameters of each layer as described before, one can obtain sufficient durability because one gets a structure in which the upper layers envelope the lower layers between vertically adjacent layers.

Next, the evaluation results of the optical disks of this invention that have structures as described above and comparative examples are described together with the method for manufacturing the optical disks. FIG. 5 is a process drawing showing the method for manufacturing the optical disks of this invention.

Table 1 shows the evaluation results for the Experimental Examples of this invention and the Comparative Examples; the materials (compounds) for the signal layers a–h listed in the table are shown in Table 2. LE-3629 (tradename) in the materials of the signal layers is a UV curable resin made by Toyo Ink MFG. Co., Ltd., and UVX-SS120 (tradename) is a UV-curable resin made by Three Bond Co., Ltd.

Also, HX-620 (tradename, made by Nippon Kayaku Co., Ltd.) is a sensitive unsaturated resin and is indicated by C5; R-684 (tradename, made by Nippon Kayaku Co., Ltd.) is also an unsaturated resin and is indicated by C6; and M-150 (tradename, made by Toagosei Chemical Industry Corporated) is also a sensitive unsaturated resin and is indicated by C7. Furthermore, Darocur 1173 is a photoinitiator mentioned previously.

TABLE 1

|  | Signal Layer Material | Dimensional Conditions for Outer & Inner Diameters | Cross Cut Test (JIS-K5400) | Peel Resistance Test | Alkali Resistance Test | Environmental Stress |
|---|---|---|---|---|---|---|
| Experimental Example 1 | a | Meets | 20/100 | OK | OK | OK |
| Experimental Example 2 | b | Meets | 25/100 | OK | OK | OK |
| Experimental Example 3 | c | Meets | 40/100 | OK | OK | OK |
| Experimental Example 4 | d | Meets | 55/100 | OK | OK | OK |
| Experimental Example 5 | e | Meets | 80/100 | OK | OK | OK |
| Comparative Example 1 | f | Meets | 90/100 | NG | OK | OK |
| Comparative Example 2 | g | Meets | 100/100 | NG | OK | OK |
| Comparative Example 3 | h | Meets | 100/100 | NG | OK | OK |
| Comparative Example 4 | LE-3629 | Meets | 90/100 | NG | OK | OK |
| Comparative Example 5 | UVX-SS120 | Meets | 100/100 | NG | OK | OK |
| Comparative Example 6 | a | Does Not Meet | 20/100 | OK | OK | NG |
| Comparative Example 7 | (Prior Art CD-ROM) | Does Not Meet | — | NG | NG | OK |

TABLE 2

| | Material of Signal Layer Compound |
|---|---|
| a | DPHA 80 parts, G-101P 20 parts, Darocur 1173 3 parts |
| b | DPHA 100 parts, Darocur 1173 3 parts |
| c | MANDA 90 parts, G-101P 10 parts, Darocur 1173 3 parts |
| d | MANDA 100 parts, Darocur 1173 3 parts |
| e | R551 100 parts, Darocur 1173 3 pats |
| f | R551 90 parts, M-150 10 parts, Darocur 1173 3 parts |
| g | HX-620 100 parts, Darocur 1173 3 parts |
| h | R-684 100 parts, Darocur 1173 3 parts |

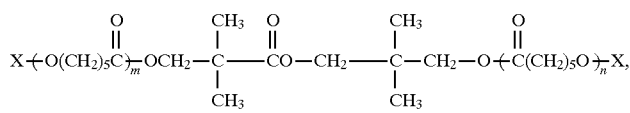

(C5)

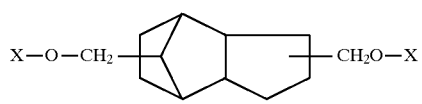

(C6)

and

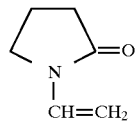

(C7)

wherein

X is acryloyl group and m+n=4.

[EXPERIMENTAL EXAMPLE 1]

First, a polycarbonate mirror surface substrate of 120 mm diameter and 1.2 mm thickness (birefringence double pass 50 nm) was prepared as disk substrate 18; the UV curable resin 24 indicated as material a in Table 1 was measured in a prescribed amount and dropped onto the surface, in a ring-shape, at a certain radius using a spin coating machine (not shown) set at a determined position (FIG. 5(A)).

Continuing, a nickel stamper 16 that had been mastered with a CD-ROM signal was pressed onto this substrate 18, held for a set time period, and the thickness of the resin layer (signal layer) made uniformly 10 mm. Next, resin 24 was cured by irradiating with ultraviolet light from an ultraviolet radiation apparatus 25 placed below substrate 18 (FIG. 5(B)).

Next, stamper 16 was peeled from the interface of the UV curable resin 24, from the side of substrate 18, to form signal layer 23 and a disk substrate with signal layer attached was produced (FIG. 5(C)).

Continuing, using common methods, reflective layer 19 made of aluminum, protective layer 20 and label layer 21 made of UV curable resin, were fabricated on this in this sequence. When fabricating, the outer diameters and the inner diameters of the respective layers met the relationship, Os<Or<Op and Ip<Ir<Is (see FIG. 5(D) and FIG. 4).

Here, Os=115 mm, Or=117 mm, Op=120 mm, Is=40 mm, Ir=38 mm, and Ip=35 mm.

Here, the method for forming signal layer 23 with a prescribed diameters between Is and Os can be performed, for example, as follows. If one sets the diameter to which UV-curable resin 24 is applied as between Is and Os on the spin coating machine, places stamper 16 on this, and applies pressure in this state for a set amount of time, the ring of the above resin 24 spreads in both directions towards the outer perimeter and the inner perimeter of the disk. As it spreads, the thickness of resin 24 becomes thinner, but one can determine the inner diameter, the outer diameter, and the thickness by controlling the pressure holding time and the final spacing between the stamper and the substrate. Conversely, if the holding time is made constant, these values can be determined by the amount of resin 24 that is first dropped. Also, the inner diameter and the outer diameter are determined by the diameter of the position at which the resin is first dropped.

Figure 6:
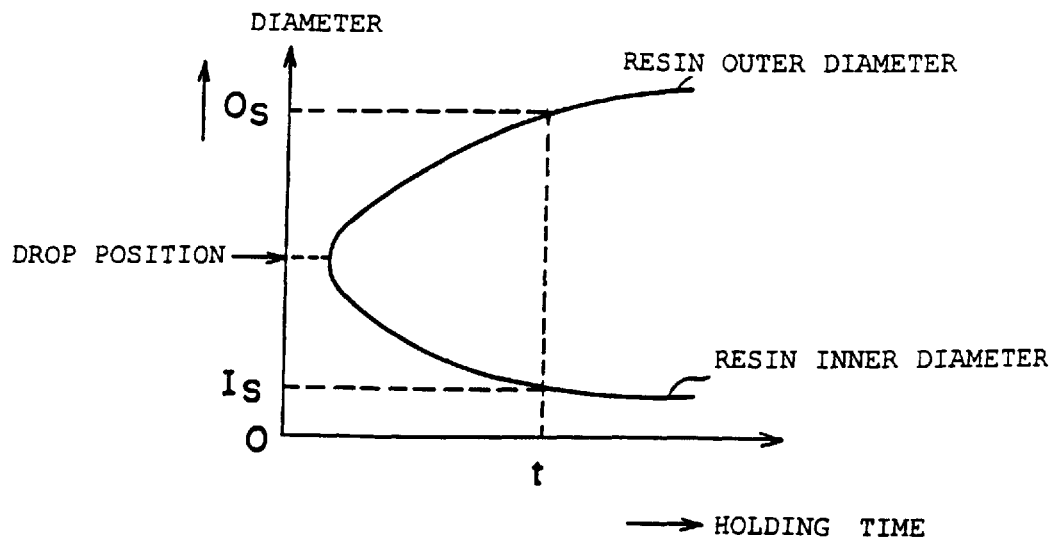
FIG. 6 is a graph showing the relationship of the resin diameter to the holding time in the manufacturing process of the optical disks of this invention.
Figure 7:
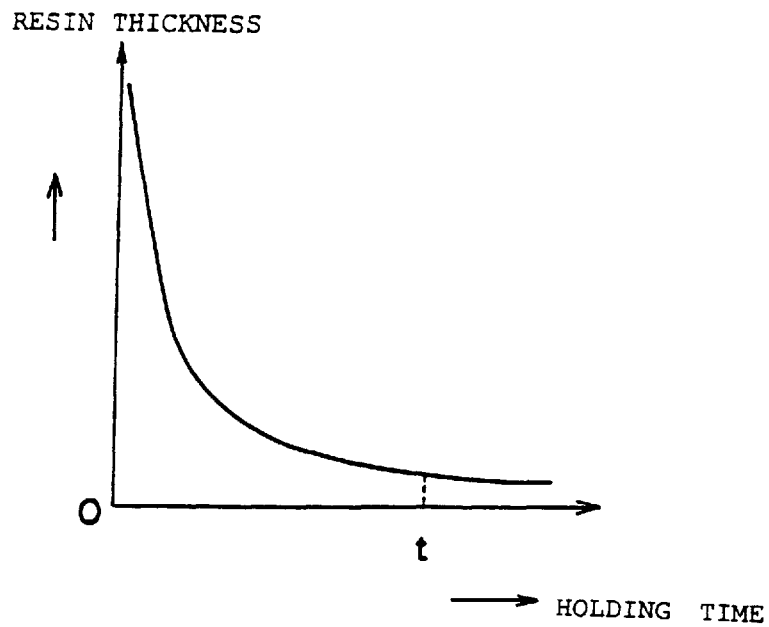
FIG. 7 is a graph showing the relationship of the resin thickness to the holding time in the manufacturing process of the optical disks of this invention.

For example, FIG. 6 is a graph that shows the relationship between the holding time and the resin diameters. FIG. 7 is a graph that shows the relationship between the holding time and the resin thickness.

As shown in FIG. 6, if the position at which the resin 24 is dropped is taken as the center, with the passage of time, the resin gradually spreads radially both towards the inside and outside of the substrate. At this time, the film thickness of the resin becomes thinner in roughly inverse proportion to the holding time as shown in FIG. 7. Accordingly, as described above, one can appropriately select the drop position of the resin and pressing time (holding time),and the like, according to the objective diameter and the like of the resin layer.

Also, the pressing time and the drop position can be appropriately set according to the viscosity of the resin to be used.

In this way, one can obtain predetermined diameters, such as Is–Os, for the diameter of resin 24 by the amount dropped, the diameter of the drop position, and the pressing time.

[EXPERIMENTAL EXAMPLE 2]

This was performed in the same way as Experimental Example 1 other than using material b in Table 2 for the UV curable resin that forms signal layer 23.

[EXPERIMENTAL EXAMPLE 3]

This was performed in the same way as Experimental Example 1 other than using material c in Table 2 for the UV curable resin that forms signal layer 23.

[EXPERIMENTAL EXAMPLE 4]

This was performed in the same way as Experimental Example 1 other than using material d in Table 2 for the UV curable resin that forms signal layer 23.

[EXPERIMENTAL EXAMPLE 5]

This was performed in the same way as Experimental Example 1 other than using material e in Table 2 for the UV curable resin that forms signal layer 23.

[COMPARATIVE EXAMPLE 1]

This was performed in the same way as Experimental Example 1 other than using material f in Table 2 for the UV curable resin that forms signal layer 23.

[COMPARATIVE EXAMPLE 2]

This was performed in the same way as Experimental Example 1 other than using material g in Table 2 for the UV curable resin that forms signal layer 23.

[COMPARATIVE EXAMPLE 3]

This was performed in the same way as Experimental Example 1 other than using material h in Table 2 for the UV curable resin that forms signal layer 23.

[COMPARATIVE EXAMPLE 4]

This was performed in the same way as Experimental Example 1 other than using commercial UV hardening resin compound LE-3629 for the UV curable resin that forms signal layer 23.

[COMPARATIVE EXAMPLE 5]

This was performed in the same way as Experimental Example 1 other than using commercial UV hardening resin compound UVX-SS120 for the UV curable resin that forms signal layer 23.

[COMPARATIVE EXAMPLE 6]

This was performed in the same way as Experimental Example 1 other than using material a in Table 2 for the UV curable resin that forms signal layer 23, and making the inner and outer diameters of each layer as follows:

$$Os=Or=Op=120 \text{ mm}, Is=Ir=Ip=40 \text{ mm}$$

[COMPARATIVE EXAMPLE 7]

A CD-ROM manufactured using prior art methods was used.

The tests listed below were performed in order to evaluate the Experimental Examples and Comparative Examples formed as above.

<Evaluating the materials: Cross Cut Test (JIS-K5400)>

Separating from the optical disks above, disk substrates (FIG. 5(C)) that are intermediates of these disks were prepared and peel tests were performed according to JIS-K5400. In other words, crosscuts were made across the signal layer 23 with 1-mm spacings using a cutter knife until 100 (10×10) cells were formed. Since several of the cells peel during this operation, if N is the number of cells remaining, then the result is shown by N/100.

<Evaluating disk protection 1: Peel Test>

Scotch 5413 (tradename, made by Sumitomo 3M Limited) tape was affixed in the radial direction to the surface of the label layer or the protective layer of the disk; after rubbing well and contacting, the tape was vigorously removed from the outer edge of the disk. If there were erased portions of the signal pits that were exposed on the substrate surface by this treatment, it was taken as OK since copying is not possible.

<Evaluating disk protection 2: Alkali Test>

Disks were alkaline treated using the same method as Experimental Example 1 recorded in Published Unexamined Japan Patent Application Hei 06-223416. In other words, the disks were immersed in aqueous solution of sodium hydroxide, sodium phosphate, sodium carbonate, and sodium lauryl sulfate that had been heated at 82° C., and this was further impressed with ultrasonic waves. As a result, the fabricated films on the disk substrates came to be peeled in about 1 hour. At that time, if there existed erased portions of the signal pits, it was taken as OK since copying is not possible.

<Evaluating disk durability: Environmental Stress Test>

The disks were placed in a 55° C., 95% RH (relative humidity) environment for 96 hours, and their C1 error rate measured after they were returned to room temperature. After the test, disks whose C1 error rate did not exceed 3% of the CD standard were taken as having durability and OK.

As is clear from the evaluation results of Table 1, according to the crosscut test, the peel test was OK for all of those that were set within the range of 20/100–80/100 (Experimental Examples 1–5, Comparative Example 6). In other words, when the protective layer, or the like was pulled away, damage occurred to the signal pits of the signal layer because the adhesive force the signal layer and the disk substrate was somewhat degraded, and copying became impossible.

Comparative Example 6, which was OK in the peel test, was NG (no good) in the environmental stress test, its durability was not sufficient in normal use times, and it was confirmed to be undesirable. In other words, the durability was degraded if the either the outer diameters of the layers or the inner diameters of the layers had the same dimensions, and it was confirmed that the structure must have the lower layers covered by the upper layers.

Also, in the alkali test, only the prior art CD-ROM of Comparative Example 7 was NG, and the other Comparative Examples 1–6 and Experimental Examples 1–5 were OK, so it was confirmed that the signal pits of the recording layer were dissolved and it became impossible to copy.

Therefore, CD-ROMs manufactured by prior art methods have signal layer and disk substrate as a single unit, and moreover, because these are made of polycarbonate, it is easy to expose the signal surface by physical or chemical peeling means without damaging the signal pits, and they have the defect that copying is allowed. However, disks of this invention have separate disk substrates and signal layers; moreover, because the adhesion of the signal layer to the disk substrate is set relatively weak and also the signal layers are made of UV curable resin that easily dissolves in alkali, the signal pits are easily destroyed by physical and chemical peeling means. Therefore, one can completely prevent the transfer of the entire signal (copying).

On the other hand, durability, which may cause concern because the adhesion of the signal layer to the disk substrate is relatively weak, can be sufficiently protected in normal use times by establishing the relationship of the outer and inner diameters of the layers as related above and by covering the lower layer completely by the upper layers.

In other words, these disks are copy protected disks that possess necessary durability. Now, making the signal layer separately increases the number of fabricated layers by one, but this layer is at most several 10s of mm so one can manufacture them without exceeding CD standards.

The method described above is a method to prevent the transferring of the patterns of the signal bits, that is, copying.

Of course this invention can be combined with prior methods of copy protecting the signal: for example, modifications so that playback cannot start unless key information is input, and modifications so that errors are generated in standard players by superimposing a special signal on the main signal. In particular, by combining prior copy protection techniques with this invention, one can achieve an even higher degree of copy protection.

This invention was explained by the above Experimental Examples using a CD-ROM as an example of an optical disk, but this invention is not limited to this. This invention can also be applied as a prevention method of duplicating secret crenulation information to other optical disks, for example, even read-only CD family disks such as CD-DA, CD-G, CD-V, CD-I, Photo CD, Video CD, and the like, and non CD family (group) disks such as Laser Disks (LD), a vision, Digital Video Disks (DVD), and the like. Furthermore, it can be applied to optical disks such as partial ROM disks that possess read-only parts and record/playback parts.

Also, this invention can be applied to multilayered disks that have multiple signal layer structures.

This invention is explained for the case of application to, for example, a dual-layered disk.

Figure 8A:
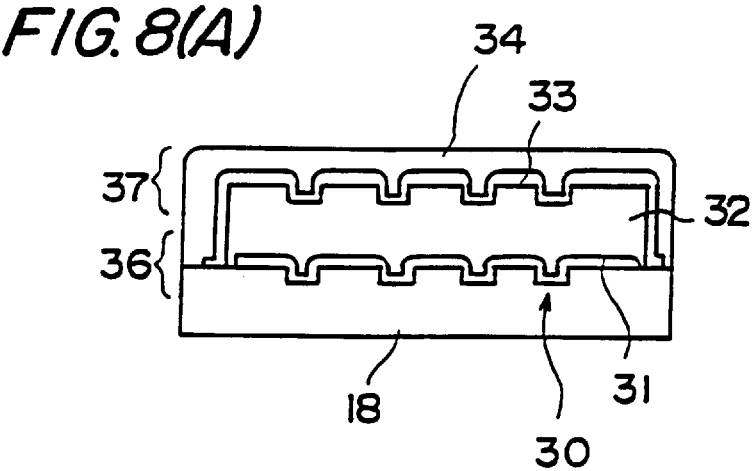
FIG. 8 is a cross section showing the state when the optical disk of this invention is applied to a dual-layered disk.
Figure 8B:
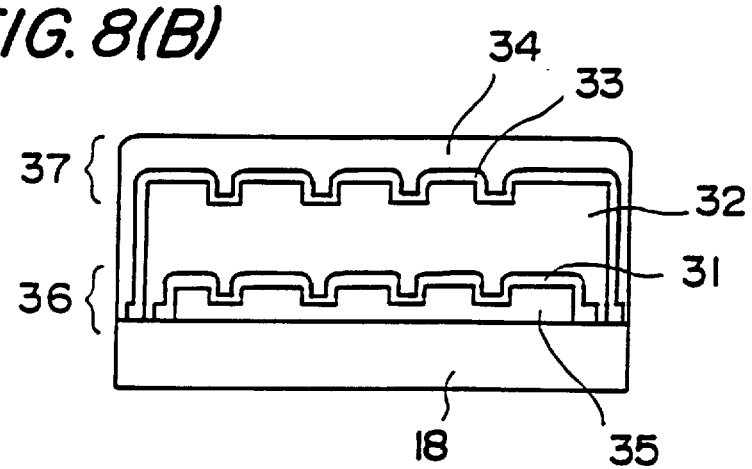

FIG. 8(A) shows a cross section for the case of copy protecting the second signal layer, and FIG. 8(B) shows a cross section for the case of copy protecting the first and the second signal layers.

In the case of FIG. 8(A), disk substrate 18 is formed by injection molding and making crenulations in its surface as the first signal layer 30, and a first semitransparent reflective layer 31 is formed thereon. Then, a first protective layer 32 is formed of UV curable resin over the entire surface of the first reflective layer 31, and a first recording component 36 is constituted thereby. Then, when forming the first protective layer 32, crenulated signals are formed in the surface of the first protective layer 32, and the protective layer 32 also functions as a second signal layer. In other words, this substrate with the first reflective layer attached is likened to a substrate without the signal formed that was explained in the previous Experimental Example, and the same upper layer (second layer) is formed thereon as the structure of this invention.

Then, by forming a second a reflective layer 33 and a second protective layer 34, in sequence, on the surface of the first protective layer, that is, the second signal layer, a second recording section 37 is formed.

In this case, the dimensional relationships of the inner diameters and the outer diameters of the first protective layer 32, the second reflective layer 33, and the second protective layer 34 are the same as for the case of the signal layer, the reflective layer, and the protective layer shown in FIG. 1.

Accordingly, the signal that is recorded in the second signal layer of the upper layer that is the second recording section 37 can be copy protected in the same way as the case of the above Experimental Examples.

However, in this case, even if the second recording component, that is, down to second signal layer 32, is removed by peeling, dissolving, or other techniques, the first signal layer 30 that forms the first recording section 36 remains. As a result, the information of the first layer cannot be copy protected.

In order to improve on this and copy protect also the information of the first recording section 36 of the lower layer as well as the second recording section 37 of the upper layer, one can make the optical disk with the structure as shown in FIG. 8(B). In other words, the crenulated signal layer are not formed in the surface of disk substrate 18 in contrast to the case of FIG. 8(A), but the first signal layer 35 is made of UV curable resin on this surface in the same way as the Experimental Examples shown in FIG. 4. Then, the first recording section 36 is made by sequentially forming the semitransparent first reflective layer 31 and the first protective layer (the second signal layer) 32 in the same way as shown in FIG. 8(A). In this case, of course, the dimensional relationships of the inner diameters and the outer diameters of the first signal layer 35, the first reflective layer 31, and the first protective layer 32 are the same as those for the signal layer, the reflective layer, and the protective layer that were shown in FIG. 4.

Then, the second recording section 37 is made by sequentially forming the second reflective layer 33 and the second protective layer 34 on top of the first protective layer 32 in the same way as shown in FIG. 8(A).

If constituted in this way, the information on the first recording layer 36 of the lower layers as well as information on the second recording layer 37 of the upper layers can also be copy protected.

Now, the above Experimental Example explained the application of this invention to a dual-layered disk, but it can of course be applied to disks having more layers than this.

FIG. 8(A) shows the case of applying this invention to the basic structure of a dual-layered disk, but of course it can be applied also to dual-layered disks having other structures, and furthermore this invention can be applied also to multilayered disks.

<Effects of This Invention>

As explained above the following excellent effects are manifested by the optical disks and method for manufacturing them of this invention.

By making the signal layer and transparent substrate as separate units, weakening the peel strength of the signal layer against the transparent substrate to some extent, together with making the signal layer of radiation curable resin that easily dissolves in alkali solutions, and restricting the sizes (diameters) so that the lower layers are covered by the upper layers directly above them, the loss of signal pits can be caused with certainty if the peeling operations are performed using physical or chemical techniques to expose the signal surface.

Therefore, one can almost completely prevent the copying (duplication) of signal pits.

Also, even in the case of multilayered optical disks that have multiple fabricated recording sections, one can almost completely prevent the copying of signal pits in the same way as mentioned above.

What is claimed is:

1. An optical disk comprising:

a transparent substrate;

a ring-shaped signal layer, on top of said transparent substrate, which is made of radiation curable resin and has a peel strength against said transparent substrate in the range of about 20/100 to about 80/100 in the test method JIS-K5400;

a reflective layer that is formed on top of said signal layer; and a protective layer that is formed on top of said reflective layer;

wherein the outer and inner diameters of said signal layer are represented by Os and Is respectively, the outer and inner diameters of said reflective layer are represented by Or and Ir respectively, and the outer and inner diameters of said protective layer are represented by Op and Ip respectively, these diameters satisfy the relationships, $$Os<Or<Op$$

and $$Ip<Ir<Is.$$

2. An optical disk according to claim 1, wherein
said transparent substrate is polycarbonate;
the radiation curable resin that constitutes said signal layer comprises a compound made by mixing a photoinitiator with one or several of the sensitive unsaturated resins shown in C8 to C11 below;

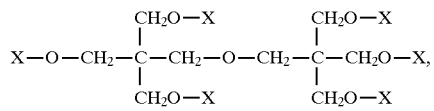
(C8)

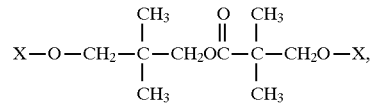
(C9)

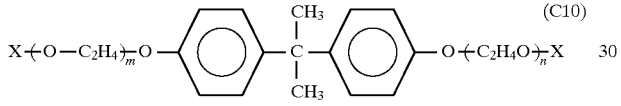
(C10)

and

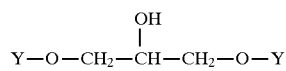
(C11)

wherein
m+n=4,
X is an acryloyl group and
Y is a methacryloyl group.

3. A method for manufacturing optical disks comprising:
a step of forming a ring-shaped signal layer on top of a transparent substrate from radiation curable resin that has a peel strength in the range of about 20/100 to about 80/100 according to the test method JIS-K5400;
a step of forming a reflective layer on top of said signal layer; and
a step of forming a protective layer on top of said reflective layer;
wherein the outer and inner diameters of said signal layer are represented by Os and Is respectively, the outer and inner diameters of said reflective layer are represented by Or and Ir respectively, and the outer and inner diameters of said protective layer are represented by Op and Ip respectively, these diameters satisfy the relationships, $$Os<Or<Op$$

and Ip<Ir<Is.

4. A method for manufacturing optical disks according to claim 3, wherein
said transparent substrate is polycarbonate;
the radiation curable resin that constitutes said signal layer comprises a compound made by mixing a photoinitiator with one or several of the sensitive unsaturated resins shown in C12 to C15 below;

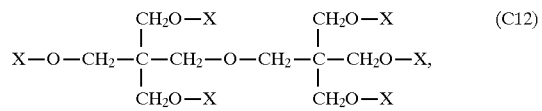
(C12)

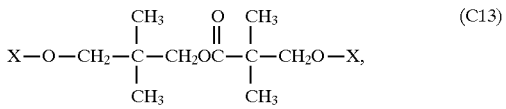
(C13)

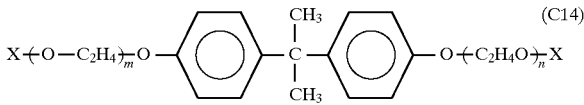
(C14)

and

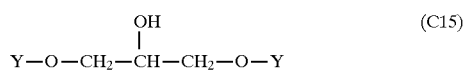
(C15)

wherein
m+n=4,
X is an acryloyl group and
Y is a methacryloyl group.

5. An optical disk comprising:
a transparent substrate; and
multiple recording sections formed from a ring-shaped signal layer, a reflective layer formed on top of said signal layer, and a protective layer formed on top of said reflective layer;
wherein said signal layer of at least one of said multiple recording sections has a peel strength against the layer beneath it in the range of about 20/100 to about 80/100 according to the test method JIS-K5400;
wherein if the outer and inner diameters of said signal layer are represented by Os and Is respectively, the outer and inner diameters of said reflective layer on said signal layer are represented by Or and Ir respectively, and the outer and inner diameters of said protective layer on said reflective layer are represented by Op and Ip respectively, these diameters satisfy the relationships, $$Os<Or<Op$$

and $$Ip<Ir<Is.$$

6. An optical disk according to claim 5, wherein
the protective layer of said recording section also functions as the signal layer of the recording section directly above it.

7. An optical disk according to claim 5, wherein
the signal layer of the bottommost recording section in said multiple recording sections is a crenulated surface formed in the surface of the transparent substrate of the optical disk.

8. An optical disk according to claim 5, wherein
the reflective layers of the recording sections except for the uppermost recording component of said multiple recording sections is semitransparent.

* * * * *